United States Patent [19]

Mukai et al.

[11] Patent Number: 4,623,935
[45] Date of Patent: Nov. 18, 1986

[54] PICTURE EXTRACTING APPARATUS

[75] Inventors: Fumiaki Mukai; Shuji Ito, both of Amagasaki, Japan

[73] Assignee: Mitsubishi Denki Kabushiki Kaisha, Tokyo, Japan

[21] Appl. No.: 644,109

[22] Filed: Aug. 23, 1984

[30] Foreign Application Priority Data

Sep. 6, 1983 [JP] Japan ................................. 58-165379

[51] Int. Cl.⁴ ............................................. H04N 1/40
[52] U.S. Cl. ..................................... 358/280; 358/294; 382/25; 382/48; 355/40; 355/74
[58] Field of Search ............... 358/280, 282, 294, 287; 382/9, 48, 61, 25; 355/40, 74, 56

[56] References Cited

U.S. PATENT DOCUMENTS

| 3,899,771 | 8/1975 | Saroya et al. | 382/60 |
|---|---|---|---|
| 4,110,736 | 8/1978 | Kono | 382/25 |
| 4,183,013 | 1/1980 | Agrawala et al. | 382/9 |
| 4,257,044 | 3/1981 | Fukuoka | 358/280 |
| 4,272,756 | 6/1981 | Kakumoto et al. | 358/293 |
| 4,539,590 | 9/1985 | Gaye | 358/282 |

Primary Examiner—James J. Groody
Assistant Examiner—John K. Peng
Attorney, Agent, or Firm—Lowe Price LeBlanc Becker & Shur

[57] ABSTRACT

A picture extracting apparatus and method extract picture signals of a picture area bounded by a black frame from a film such as a microfilm or an ultramicrofilm where the black frame is applied in the upper, lower, left and right borders. More specifically, a CPU (9) determines the upper and lower black frame portions based on the number of "black" picture signals for each scanning line of a film counted by a counter (4) and specifies the associated scanning lines. In response to the change in the picture signals from "black" to "white" and from "white" to "black" on the specified scanning lines, the left and right black frame portions are determined and the respective addresses of the rear and front edges of these picture signals are specified by a rear edge register (5) and a front edge register (6). A gate circuit (3) passes therethrough only the picture signals between the addresses of the specified scanning lines to extract the picture signals of the picture area bounded by the black frame.

4 Claims, 5 Drawing Figures

PRIOR ART  FIG.1
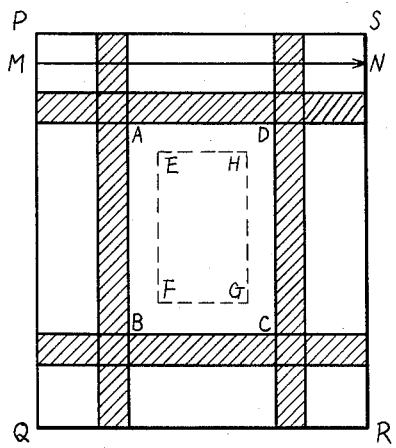
FIG.2
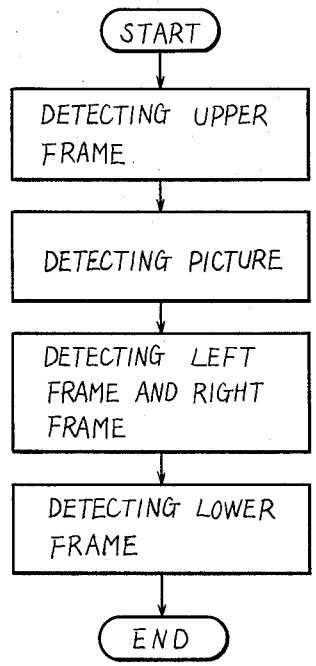

PICTURE EXTRACTING APPARATUS

BACKGROUND OF THE INVENTION

1. Field of the Invention

The present invention relates to a picture extracting apparatus and method. More particularly, the present invention relates to an improvement of a picture extracting apparatus and method in which picture signals of a picture area bounded by a reference frame are extracted from a film such as a microfilm or an ultramicrofilm where the reference frame is applied in the upper, lower, left and right borders.

2. Description of the Prior Art

FIG. 1 is a diagram showing a structure of a scanned picture area obtained by scanning of a reading sensor which constitutes a background for the present invention and to which the present invention is applied. Generally, for a picture recorded in a film such as a microfilm or an ultramicrofilm, a black frame exists for each frame of recording as shown in FIG. 1, that is, the black frame defines the upper, lower, left and right borders for each frame of recording. In a reading sensor for converting such tone in a film into an electrical signal, the scanning area of the reading sensor is made considerably larger than the picture area of one frame as shown in FIG. 1. This picture area is generally called a scanned picture area. This serves to make up for the tolerance of a film stop position of a positioning mechanism, or the irregularities in the recording conditions of the film or the optical conditions of a reading apparatus.

On the other hand, the desired picture area is an area of $\overline{ABCD}$ shown in FIG. 1. However, if picture signals of the scanning area are provided as they are, a picture having a black frame on the upper, lower, left and right borders is transmitted. In such case, the quality of a reproduced picture (a copy) is extremely deteriorated, resulting in decrease of the commercial value. At the same time, since a large amount of unnecessary picture signals must be transmitted, not a small loss is caused in the transmission efficiency or the transmission cost.

SUMMARY OF THE INVENTION

Therefore, a primary object of the present invention is to provide a picture extracting apparatus and method in which only picture signals concerning the useful picture area of a picture can be extracted.

Briefly stated, a picture is scanned to make the tone of the picture convert into binary value of first and second levels and signals of one level out of the two levels are counted for each scanning line. Then, an address signal representing the position of the rear edge of the picture signals on the scanning line concerned and an address signal representing the position of the front edge thereof are stored temporarily. If the count value is less than a predetermined value, only the picture signals between the scanning lines represented by the temporarily stored address signals are made to pass through.

Accordingly, extracting processing can be made with an extremely high speed and a picture of good quality without any black frame can be obtained, since a picture area excluding the black frame can be extracted and transmitted. In consequence, if the present invention is applied to a reading apparatus and the like, not only the commercial value but also the transmission efficiency can be improved and the transmission cost can be reduced.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a structure of a scanned picture area obtained by scanning of a reading sensor which constitutes a background for the present invention and to which the present invention is applied;

FIG. 2 is a flow chart showing the processing procedures for extracting a picture area in an embodiment of the present invention;

DESCRIPTION OF THE PREFERRED EMBODIMENTS

Referring to FIG. 1 as described above, the scanning area of a reading sensor is shown as $\overline{PQRS}$ and one frame $\overline{ABCD}$ of a film bounded by the upper, lower, left and right black frames (the shaded portions shown in FIG. 1) corresponds to a desired picture area. Assuming that a scanning line of the reading sensor is represented as MN, picture signals for a desired frame can be obtained when this line MN moves from the upper end of the picture area to the lower end thereof.

FIG. 2 is a flow chart showing the processing procedures for explaining the principle of the present invention. Now, referring to FIG. 2, the principle of the present invention will be briefly described. According to the movement of the reading sensor from the upper side to the lower side, first, the upper black frame portion is detected. Then, the upper end AD of the picture area is detected. At this time, extraction of the left and right black frame portions is started and simultaneously scanning operation continues downwards so that picture signals are transmitted till the black frame on the lower side, namely, the lower end BC of the picture area is detected. Thus, the extraction of the picture area $\overline{ABCD}$ is completed.

Figure 3:
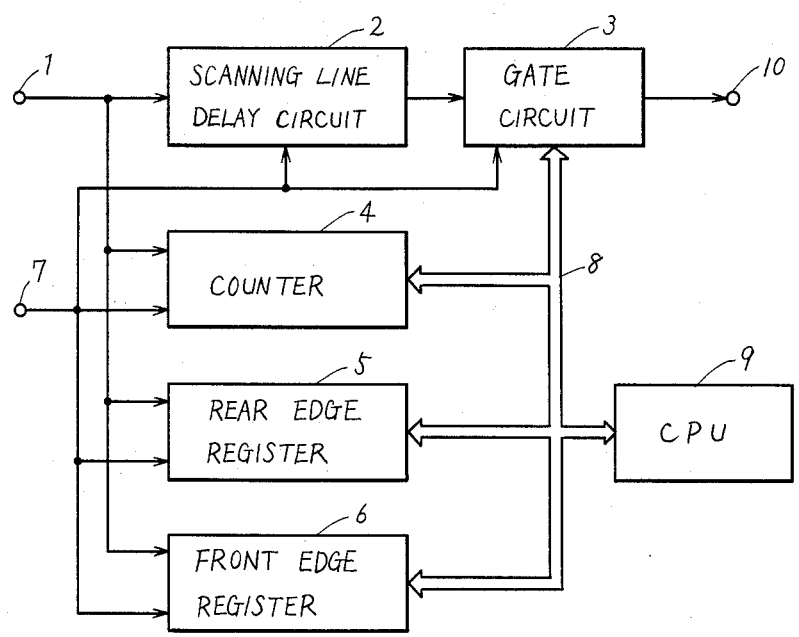
FIG. 3 is a schematic block diagram showing an electrical structure of an embodiment of the present invention.

FIG. 3 is a schematic block diagram showing an electrical structure of an embodiment of the present invention. First, referring to FIG. 3, the structure of an embodiment of the present invention will be described. To an input terminal 1, binary picture signals representing the tone of a picture in two levels of black and white are applied. Picture signals applied to the input terminal 1 are supplied to a scanning line delay circuit 2, a counter 4, a rear edge register 5 and a front edge register 6. The scanning line delay circuit 2 serves to delay scanning for n scanning lines, for example, with a predetermined delay time. The picture signals delayed by the scanning line delay circuit 2 are supplied to a gate circuit 3. The counter 4 serves to count the number of black signals contained in one scanning line and is structured by an IC such as M74LS163 of Mitsubishi Electric Corp. The rear edge register 5 serves to latch a change point from a black signal to a white signal in the left black frame portion, that is, an address signal on the scanning line of the rear edge of the picture signal. This rear edge register is structured by an IC such as M74LS373 of Mitsubishi Electric Corp. The front edge register 6 serves to latch a change point from a white signal to a black signal in the right black frame portion, that is, an address signal on the scanning line of the front edge of the picture signal. This front edge register is structured by an IC such as M74LS373 of Mitsubishi Electric Corp. To the input terminal 7, a strobe signal is applied for each bit of the two-valued picture signals for the purpose of synchronization with the respective circuits.

The above described gate circuit 3, counter 4, rear edge register 5 and front edge register 6 are connected respectively to a CPU 9 through a bus line 8. The output of the gate circuit 3 is supplied to an output terminal 10.

Figure 4A:
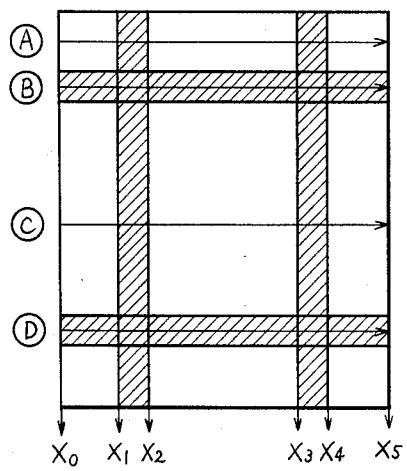
FIGS. 4A and 4B are diagrams showing a relation between the scanned picture area and the picture signals.
Figure 4B:
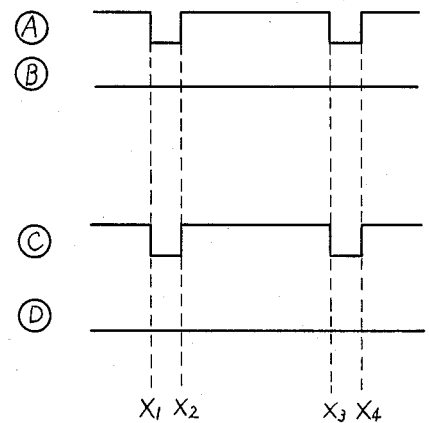

FIGS. 4A and 4B are diagrams showing the positions of a reading sensor in the scanned picture area and waveforms of the picture signals applied to the input terminal 1 at the above stated positions for the purpose of explaining the operation of an embodiment of the present invention.

Now referring to FIGS. 2 to 4B, the operation of an embodiment of the present invention will be described in detail. The reading sensor scans successively the scanning lines from the upper side to the lower side. At the point ⓐ, "white signals" continue to be applied from $X_0$ to $X_1$ and "black signals" exist from $X_1$ to $X_2$ in the left frame portion. From $X_2$ to $X_3$, "white signals" appear again. This portion from $X_2$ to $X_3$ corresponds to a desired picture area. From $X_3$ to $X_4$, "black signals" exist as the right frame portion, and from $X_4$ to $X_5$, "white signals" appear. The address of $X_2$ corresponds to the address of the rear edge and the address of $X_3$ corresponds to the address of the front edge.

The counter 4 counts and latches the number of "black, signals" in the portion from $X_1$ to $X_2$ and in the portion from $X_3$ to $X_4$ each time scanning operation is made for one scanning line. The count value of the counter 4 is supplied to the CPU 9 through the bus line 8 for each scanning period (generally several meters per sec.) so as to be applied as the upper frame portion detecting data according to the processing procedures shown in FIG. 2.

For detection of the upper frame portion, when the count of the "black signals" in the counter 4 becomes equal to or exceeds a certain value, it is determined that this point is the start point of the upper frame portion. For example, if a scanning line of the reading sensor is composed of 2048 bits, it is determined that the upper frame portion starts if the number of "black signals" is 1024 or more.

Then, the CPU 9 starts to determine a point where the "black signals" in the upper frame portion decrease. More specifically, when the CPU 9 determines that the number of "black signals" decreases to be less than a predetermined value, for example 256 bits, in contrast to the detection of the upper frame portion, it is considered that the upper frame portion is brought to an end. This means that the picture area AD starts.

Subsequently, the left and right lines AB and CD of the picture area are extracted. This extraction operation corresponds to the point ⓒ in FIGS. 4A and 4B. Since the left frame portion corresponds to the change point from a "black signal" to a "white signal" in the picture signals, the address of $X_2$ is temporarily stored in the rear edge register 5. On the other hand, since the right frame portion corresponds to the change point from a "white signal" to a "black signal" in the picture signals, the address of $X_3$ is temporarily stored in the front edge register 6. These stored values in the registers 5 and 6 are set in the gate circuit 3 so that picture signals of $X_2$ and $X_3$ are obtained.

The difference between black portions of the picture signal and the right/left frame portions $X_1$-$X_2$ and $X_3$-$X_4$ is easily recognized by CPU which is calibrated with data describing the precision or mechanical stop position of the reader and representing approximate addresses of those frame portions. Furthermore, the CPU 9 is able to distinguish between short or transient black signals indicative of video information and black signals having the predetermined duration of a frame portion.

While the above described processing operation is performed, the counter 4 continuously counts the "black signals" to detect the lower frame portion. When a scanning line passes through the lower frame portion, the picture signals become in the state shown in FIG. 4 ⓓ. Consequently, it is determined that the lower frame line BC is attained and the picture area comes to an end.

Since it is by the processing operation of CPU 9 that the start or the end of the picture area is determined based on the count of the counter 4, it is necessary to delay the application of the picture signals by a period of time required for the processing in CPU 9. For this purpose, between the input terminal 1 and the gate circuit 3, a scanning line delay circuit 2 for delaying scanning for 16 lines, for example, is connected.

In the foregoing description, the operation for extracting the picture area $\overline{ABCD}$ was explained. However, depending on a film and a reading apparatus actually utilized, there might exist irregularities in the inclination of a picture or the width of a black frame and if the values of the counter 4, the rear edge register 5 and the front edge register 6 are applied without any modification, there is a fear of deteriorating the quality of the picture. For this reason, it is desirable to extract, as a real useful picture area, the area $\overline{EFGH}$ existing inside the area $\overline{ABCD}$ with certain distances from the respective sides of the area $\overline{ABCD}$ corresponding to several dots to several tens of dots, and to provide the area $\overline{EFGH}$ from the output terminal 10. Such extraction of $\overline{EFGH}$ can be easily performed if the counter 4, the registers 5 and 6, for example, take account of permissible errors in the specified scanning lines and the edge addresses.

Although the above description of the embodiment was made with regard to the picture signals applied as two-valued input signals, the present invention can also be applied to the digital data having an intermediate region not two-valued. In addition, the present invention is not limited to a monochromatic picture. The same processing operation can be applied to a color picture so that a picture of special colors can be extracted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A picture extracting apparatus comprising:
   an input terminal to which input picture signals obtained by scanning on a picture and two-valued in first and second levels concerning the tone of said picture are applied, counting means for counting for one scanning line, signals of either of said first level and said second level in said input picture signals, first storing means for temporarily storing an address signal representing the position of the rear edge of said picture signal on the scanning line, based on said input picture signals, second storing means for temporarily storing an address signal representing the position of the front edge of said picture signal on the scanning line, based on said input picture signals, determining means for determining, based on the count of said counting means, whether the count is less than a predetermined value, gate means through which picture signals on the scanning line between the address signals temporarily stored in said first and second storing means are made to pass if it is determined based on the output of said determining means that the count of said counting means is less than the predetermined value, and delay means for delaying said input picture signals applied to said gate means by a predetermined period of time.

2. A picture extracting apparatus in accordance with claim 1, wherein said picture includes a reference frame provided in the upper, lower, left and right borders in a film as well as a picture area bounded by said reference frame.

3. A picture extracting apparatus in accordance with claim 2, wherein said determining means comprises means for determining a first scanning line if the count of said counting means becomes less than a value corresponding to the lower end of the upper frame portion of said film and a second scanning line if the count of said counting means exceeds a value corresponding to the upper end of the lower frame portion of said film, and said gate means comprises means through which picture signals between the address signal temporarily stored in said first storing means and the address signal temporarily stored in said second storing means are made to pass for each scanning line included from the determination of said first scanning line to the determination of said second scanning line by said determining means.

4. A method of extracting picture data from an input picture bounded by upper, lower and side frame portions, comprising:

scanning the picture and frame portions along successive scanning lines to obtain input picture signals that are two-valued in first and second levels concerning the tone of the picture;

counting for each scanning line signals of either the first level or second level in the input picture signals;

temporarily storing an address signal representing the position of a first edge of the picture signal on the scanning line, corresponding to one of the frame portions, based on the input picture signals;

temporarily storing an address signal representing the position of the second edge of the picture signal on the scanning line, based on the input picture signals;

determining based upon the result of the counting step whether a count is less than predetermined value;

delaying the picture signals by a predetermined period of time to provide delayed picture signals; and gating said delayed picture signals to an output only if said count is less than the predetermined value.

* * * * *